United States Patent [19]
Snyder

[11] 3,754,996
[45] Aug. 28, 1973

[54] DUCTILE AMPULE DEFERRED ACTION BATTERY

[75] Inventor: Gilbert R. Snyder, Arlington, Va.

[73] Assignee: The United States of America as represented by the Secretary of the Army, Washington, D.C.

[22] Filed: June 28, 1972

[21] Appl. No.: 266,958

[52] U.S. Cl. ................................. 136/90, 136/114
[51] Int. Cl. ........................................ H01m 17/06
[58] Field of Search ................. 136/90–92, 112–114

[56] References Cited
UNITED STATES PATENTS

| | | | |
|---|---|---|---|
| 3,211,588 | 10/1965 | Marsal | 136/90 |
| 3,239,385 | 3/1966 | Meyers | 136/90 |
| 2,783,291 | 2/1957 | Gold | 136/113 |
| 2,852,592 | 9/1958 | Salauze | 136/113 |
| 3,236,697 | 2/1966 | Amiet et al. | 136/90 |
| 3,663,302 | 5/1972 | Kaye | 136/114 |
| 2,921,974 | 1/1960 | Mott-Smith | 136/90 |
| 2,918,515 | 12/1959 | Lawson | 136/114 |

FOREIGN PATENTS OR APPLICATIONS

| | | | |
|---|---|---|---|
| 1,149,556 | 4/1969 | Great Britain | 136/112 |

*Primary Examiner*—Harvey E. Behrend
*Attorney*—Harry M. Saragovitz, Edward J. Kelly et al.

[57] ABSTRACT

A ductile ampule deferred action battery for use in fuses and other projectiles which is actuated internally by the set back forces of acceleration from a gun or other impelling means. This battery comprises an ampule that contains a weight attached to a spring, said weight and said spring having their principle axis parallel to the acceleration vector such that upon acceleration said weight depresses said spring causing the cutter attached to the weight to pierce the ductile ampule. This ampule and battery assembly will not break upon dropping or activate upon dropping because (1) the ampule is made out of the ductile material, (2) the weight spring combination immersed in the electrolyte acts as a dash-pot and the loading imparted to the weight upon dropping and normal handling is not sufficient to overcome the dash-pot forces exerted upon the weight and cause the weight to move enough such that the cutter can pierce the ampule. The ampule is used in combination with an annular stack of battery elements having the holes therein alligned to form a continuous passage into which said ampule is inserted.

15 Claims, 3 Drawing Figures

Patented Aug. 28, 1973

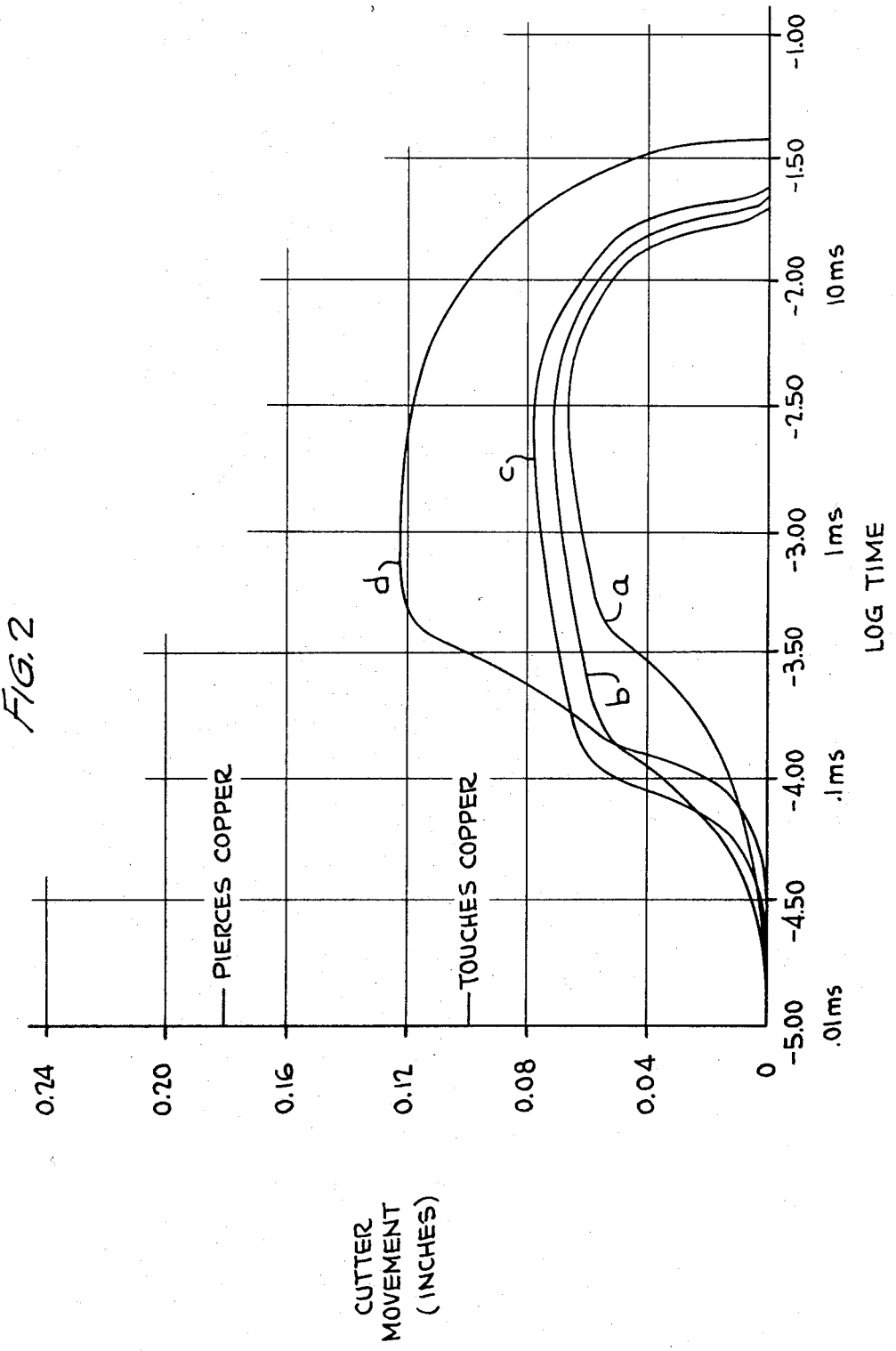

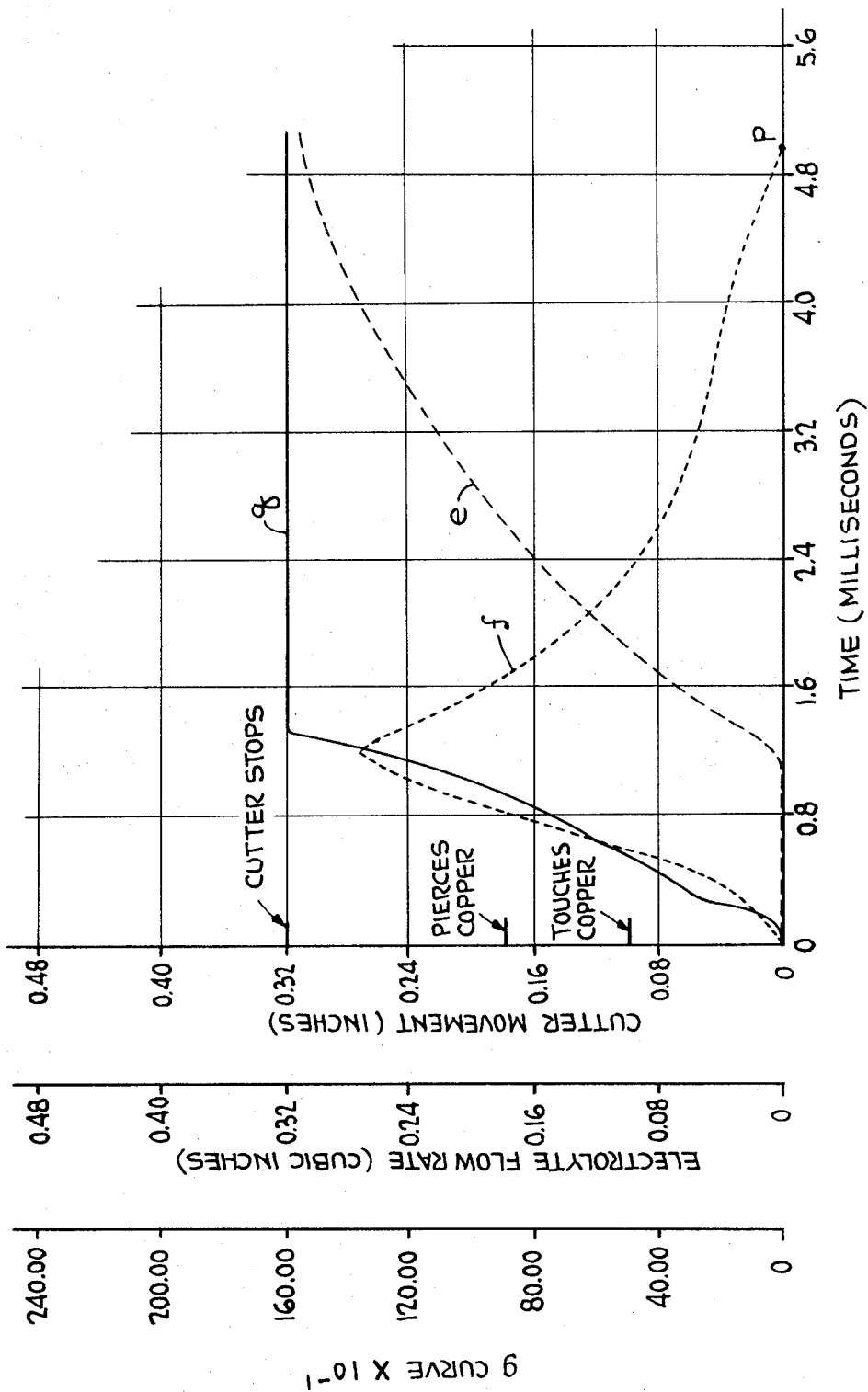

DUCTILE AMPULE DEFERRED ACTION BATTERY

RIGHTS OF THE GOVERNMENT

The invention described herein may be manufactured, used, and licensed by or for the United States Government for governmental purposes without the payment to the inventor of any royalty thereon.

BACKGROUND OF THE INVENTION

This invention relates generally to an improved electrochemical battery, and more particularly, to a new and improved arrangement and construction of an ampule located in the central proportion of the battery cells. This deferred action type battery contains a cell electrolyte which is not applied to the electrodes until immediately before use. Unusual handling and dropping of this new battery before firing will not cause activation of the cells.

For certain military uses such as artillery shells and the like, operation of some components is powered by primary batteries. Since operation is desired only at the moment of use, these batteries are of the deferred action type, and it is essential that the battery be activated substantially instantaneously when it is called upon for service. The necessity for instantaneously activation requires rapid introduction of an electrolyte to the elements of the battery in the device. For this purpose, in artillery shells advantage is taken of the set-back of centrifical forces attributable to the firing of the shell. There is consequently a demand for a deferred action battery which may be activated instanteously upon demand in the present of set-back and spin forces.

Set-back means a certain acceleration is applied to the battery for certain period of time. A drop safe battery means one which can be dropped in any position on any surface without activating the battery. The distance to drop is usually five feet or more.

Previous attempts to solve this problem have used in combination with a stack of cell elements, a supply liquid electrolyte in a frangible ampule supported by various members which facilitate the fracture of the ampule upon set-back or other type force caused by gun firing. One such device uses a piston impelled into the ampule by an explosive charge. Other such devices simply using a thin wall glass ampule that is easy fractured upon firing. The only problem with these approaches is that they may also be broken by dropping and not just firing thus causing premature activation of an explosive device during handling. The invention described herein over comes this problem.

The principle object of this invention is to satisfy the demand for safety related to the unexpected dropping of a projectile loaded with explosive containing a deferred action battery therein.

More specifically, it is an important object of this invention to provide a non-frangible ampule deferred action primary battery in which an electrolyte is released upon exposure of the ampule to a time-acceleration environment predetermined by the design of a spring and weighted cutter enclosed within the ampule.

SUMMARY OF THE INVENTION

A ductile ampule deferred action battery for use in fuzes and other projectiles which is actuated internally by the set-back forces of acceleration from a gun or other impelling means. This battery comprises an ampule that contains a weight attached to a spring, said weight and said spring having their principle axis parallel to the acceleration vecter such that upon acceleration said weight depresses said spring causing a cutter attached to the weight to pierce the ductile ampule. This ampule and battery assembly will not break or activate upon dropping because (1) the ampule is made out of the ductile material and (2) the weight spring combination immersed in the electro-lyte acts as a dash-pot and the loading imparted to the weight upon dropping and normal handling is not sufficient to overcome the dash-pot forces exerted upon the weight to cause the weight to move enough such that the cutter can pierce the ampule. The ampule is used in combination with a annular stack battery having elements therein alligned to form a continuous passage into which said ampule is inserted.

BRIEF DESCRIPTION OF THE DRAWING

The specific nature of this invention as well as other objects, aspects, uses, and advantages thereof will clearly appear from the following descriptions and from the accompanying drawing in which:

FIG. 2 is a graph of the cutter movement versus the log of the time of acceleration of the battery for various acceleration signatures.

FIG. 3 is a graph of the cutter movement electrolyte flow into, and acceleration versus real time.

DESCRIPTION OF THE PREFERRED EMBODIMENT

Figure 1:
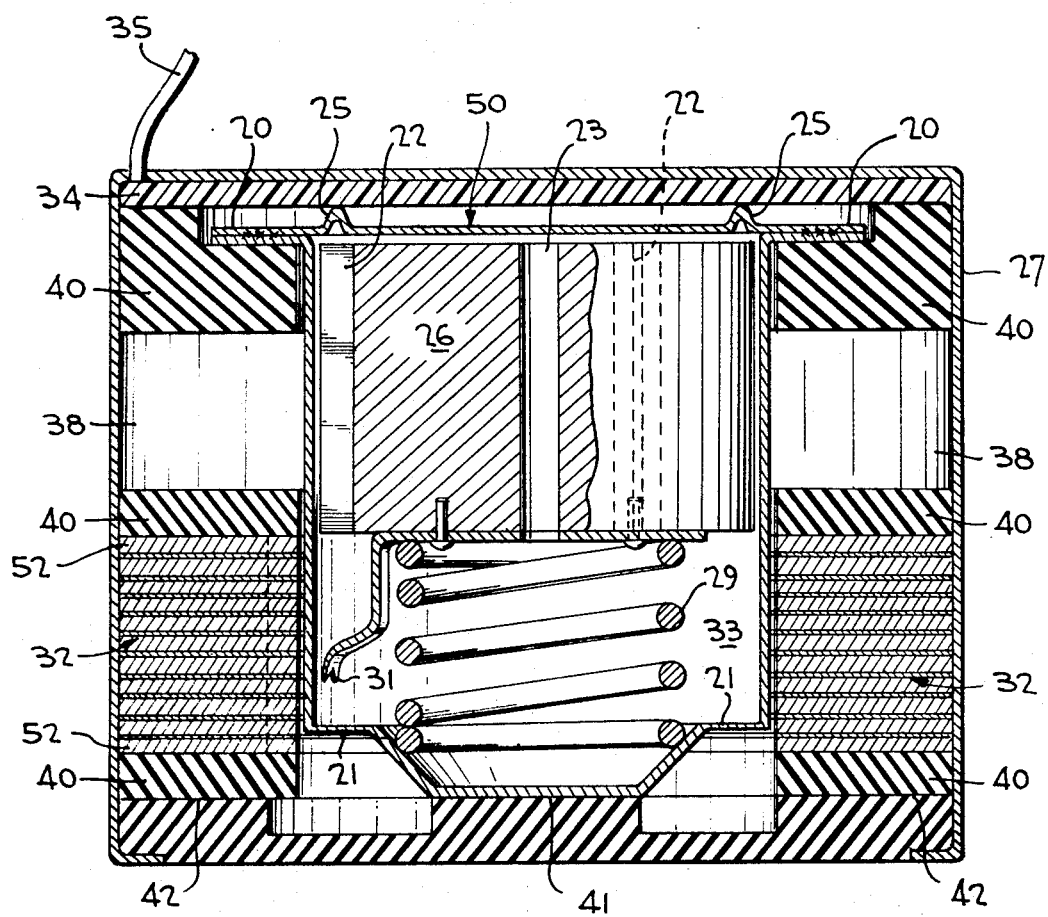
FIG. 1 is a cross-section of the ductile ampule deferred action battery.

The present invention will be easily understood in its broad aspects by reference to FIG. 1 wherein there is shown a cross-section of an embodiment of this invention. The ampule 21 is centrally located and upon opening activated by a rifle gun signature as illustrated in FIG. 2, empties electrolyte into the empty cells 52 by centrifugal force due to the spinning of the shell and the ampule. The spring 29 is used to keep the weight 26 and cutter 31 at the top of the ampule 21 so that on the set-back the weight 26 must move through the liquid 33 before the ampule 21 is cut. (If the spring were not there, the cutter points may rest against the copper and thus cutting might result under low shock.) The actual restraining force of the spring 29 is negligible compared with the other forces during drops or shots.

This particular embodiment is a design for a battery for use in a 155 millimeter shell loaded at the minimum charge. The curve peaks at 1350g at 10 milliseconds and then goes to zero at about 50 milliseconds (See FIG. 3).

The drop acceleration is that of a 2 pound steel cup carrying the ampule 21 when it strikes a large block of steel, 3 inches thick: The Navy drop test. The signature is calculated to be 52,000g at peak (and assumed to be a half sign wave, 13 microseconds wide).

This particular embodiment has the following physical constants. The inside diameter of the ampule is 1.15 inches. The perpendicular cross-section area of the ampule is 1.034 square inches. The cross sectional area of the piston taken perpendicular to the cyclical axis is 0.98 square inches. The difference in diameter between the piston and inside diameter of the ampule is approximately 0.004 inches. The area difference between the cylinder 26 and the inside cross-section area of the ampule 21 is approximately 0.0531 square inches. This area difference include 3 grooves at the periphery of the piston and one hole through the center of the piston. The spring constant is 1.11 pound per inch. Spring compression with the piston and the rest position is approximately 0.256 pounds. The viscosity of the electrolyte varies between 8 centipoise in the worse case in gun firing at minus 30° F. to 1 or 2 centipoise in the worst case in dropping at plus 130° F. The weight of the piston in air including the cutter and the effective weight of the spring is equivalent to 0.0907 pounds. The piston travel distance before the copper is servered is 0.100 inches. The distance of travel necessary to pierce the copper is 0.180 inches. The maximum distant of cutter travel is 0.320 inches. The force required to pierce the copper is 75.2 pounds, of course 75.2 is an approximate value. The range varies between 65 to 90 pounds maximum. The size of the air bubble above the electrolyte is 0.050 inches times the cross-sectional area of the ampule 21, three grooves 22 are cut into the periphery of the piston. These holes are triangular in shape. The thickness of the copper being cut is approximately 0.010 inches. Total volume of electrolyte involved is 0.973 cubic inches the above are the necessary quantities in order to design this particular embodiment of the invention.

An ampule and cutter assembly of a different size may be designed by a computer utilizing the above constants. For the new design the diameter and volume of the ampule needed are adjusted, the length of the cutter is adjusted such that about 0.100 inches of travel is required to touch the points to the copper, and the size of the slots and holes in the piston are adjusted such that they will not move far enough or sufficiently in a drop test but will cut adequately in a minimum gun shot.

FIG. 2 shows results of a drop test at 130° F. Curve a is a normal 7 feet drop to a steel plate. This drop is equivalent to 52,000g at 13 microseconds. Curve b is equivalent to 52,000g at 41 microseconds. Curve c is equivalent to 52,000g at 130 microseconds. Curve d is equivalent to 52,000g's at 410 microseconds. Curves b, c, and d are over-tests which show a safety factor of at least 10 to 1.

FIG. 3, Curve e, shows the volume of electrolyte as a function of time which is released from the ampule. Curve f shows the amount of acceleration in g's stress versus time for a minimum gun show. Point P denotes the end of the gun barrel per curve f. Curve q of FIG. 3 shows the result of over-acceleration versus time at the point at which the cutter movement stops.

Referring to the drawing in FIG. 1, the essential body of the invention comprises a stack of annular cell elements 52 arranged in apposition and comprising cathode and anode elements and bibulous separators 32. Spacers 40 supports these cells elements. Cavity 38 is a sump located in between insulators 40 and above the cell elements 52. A spacer 34 in the shape of a flat cylindrical disk insulates the ampule 50 from the cylindrical housing 27.

The ampule 50 is cylindrical and has a truncated conical extrusion at the bottom which rests at the interface 41. At the periphery of this extrusion 41 is a coined portion of the copper ampule 50. This coined annular 21 surrounds the truncated conical protrusion 41. The spring 29 has one end thereof resting in the cavity provided by protrusion 41. Between the spring 29 and the weight or piston 26 is interposed the cutter 31. Cutter 31 is attached to the piston 26 by means of rivets. The bifurcated tip of the cutter is bent such that it is poised above the coined annulus 21. In the center of the piston 26 is provided a passage way 23 in the shape of a cylindrical hole. At the sides of the piston 26 are several triangular grooves 22. These grooves and holes as well as the cavity surrounding the spring and cutter are filled with an electrolyte 33. An atmosphere remains above the piston 26 the copper ampule is sealed with lid 20. The edges are sealed airtight by a cold well. Top supporting edges 25 are provided by coining the lid 20. 35 is a power lead from the cells. Upon experiencing the proper g signature as indicated in FIG. 3 curve q, the cutter 31 is moved toward the coined section 21 by the g forces exerted upon the piston 26 causing the coined section 21 to rupture and thus permitting electrolyte 33 to flow inbetween spaces of the various cells provided by the combination of plates 52 and bibulous separators 32 and inturn energizing the cells.

It is to be understood that the inventor does not desire to be limited to the exact details of constructions shown in described for obvious modifications will occur to a person skilled in the art herein presented.

What is claimed is:

1. A sealed ampule comprising a non-frangible electrolyte-impervious cylinder having a fluid electrolyte therein, a resilient member located at the bottom of said cylinder, said cylinder further having therein a substantially close fitting cylindrical piston immersed in said electrolyte and connected to said resilient member, and means attached to said piston and immersed in said electrolyte for puncturing said cylinder whereby said cylinder, member, and piston comprise a dashpot and whereby said resilient member counteracts forces exerted upon said piston.

2. The ampule according to claim 1 wherein said cylinder is a ductile hollow cylinder and wherein said piston comprises a first means for determining the flow of said electrolyte through said piston.

3. The ampule according to claim 2 wherein said dashpot further comprises a second means for determining the flow of said electrolyte around said piston.

4. The ampule according to claim 3 wherein said first means comprises at least one passage way in said piston.

5. The ampule according to claim 4 wherein said passageway comprises at least one through hole in said piston, and wherein said resilient member comprises a spring supporting said piston.

6. The ampule according to claim 5, wherein said cylinder comprises a fore end, an aft end, said aft end being closed and having at least one region therein, said region being the weakest structural part of said cylinder and located beneath said cutter means.

7. The ampule according to claim 6, wherein said cylinder further comprises a cap member closing said fore end and wherein said aft end has a substantially cylindrical depression therein, said depression having a diameter and being surrounded by an annular portion, said portion having said region therein, said spring having a diameter less than the diameter at said depression and fitting into said depression.

8. The ampule according to claim 7, wherein said piston having two ends is concentric within said cylinder, and wherein said/second means comprises at least one slot in the side of said piston and a spacing between said piston and said cylinder whereby said slot and said spacing permit electrolyte to flow from one end of said piston to the other end of said piston when said spring is depressed by said piston.

9. In combination, a stack of annular battery elements having apertures therein aligned to form a continuous passage through said stack, said battery elements including bibulous separators adapted to soak up electrolyte and distribute the same into contact with electrode elements, a sealed ampule comprising a non-frangible electrolyte impervious cylinder having a liquid electrolyte therein, said cylinder further having therein a spring located at the bottom of said cylinder, a substantially close fitting cylindrical piston connected to said spring and immersed in said electrolyte, and means attached to said piston said means immersed in said electrolyte for puncturing said cylinder, said ampule being located within the central aperture of said annular stack whereby said cylinder, spring, and piston comprise a dashpot and whereby said spring counteracts forces exerted upon said piston.

10. In the combination defined by claim 9, said cylinder which comprises a fore end, an aft end, said aft end being closed and having at least one region therein, said region being the weakest structural part of said cylinder and located beneath said means.

11. In the combination defined by claim 10, said cylinder further comprising a cap member closing said fore end, said aft and having a substantially cylindrical depression therein, said depression having a diameter and being surrounded by an annular portion having said region therein and said spring having a diameter less than the diameter of said depression and fitting into same.

12. In the combination defined by claim 11, a cylinder having an air bubble entrapped therein, means for determining electrolyte flow pass said piston, wherein said means comprises at least one through hole in said piston, said piston having a cutter means attached thereto, said cutter means having at least one point at the end thereof, said means protruding away from said piston and said spring supporting said piston, said spring having its principal axis aligned in the direction of support for said piston.

13. In the combination defined by claim 9, said cylinder, said spring, said piston, and means for interconnecting same comprising a ductile material, and wherein said cylinder comprises a fore end, an aft end, said aft end being integrally closed, a cap member, said member closing said for end, a cylindrical depression in said aft end having a diameter, said spring having a diameter less than the diameter of said depression and fitting therein, an annular portion of said aft end surrounding said depression said portion having at least one thin region therein located beneath said cutter means.

14. In the combination defined by claim 13, said ductile material comprising copper and wherein said piston having two ends is concentric within said cylinder, and wherein said piston further comprises at least one slot in the side thereof, and wherein/said slot provides means for permitting said electrolyte to flow from one end of said piston to the other end of said piston when said spring is depressed by said piston.

15. In the combination defined by claim 14, the improvement wherein said cap member is attached to said fore end by a cold weld.

* * * * *